(12) United States Patent
Turek et al.

(10) Patent No.: US 11,713,056 B2
(45) Date of Patent: Aug. 1, 2023

(54) AUTONOMOUS VEHICLE SYSTEM FOR DETECTING SAFETY DRIVING MODEL COMPLIANCE STATUS OF ANOTHER VEHICLE, AND PLANNING ACCORDINGLY

(71) Applicants: Intel Corporation, Santa Clara, CA (US); MobilEye Vision Technologies Ltd.

(72) Inventors: Javier Turek, Beaverton, OR (US); Ignacio J. Alvarez, Portland, OR (US); Maria Soledad Elli, Hillsboro, OR (US); Javier Felip Leon, Hillsboro, OR (US); David I. Gonzalez Aguirre, Hillsboro, OR (US)

(73) Assignees: Intel Corporation, Santa Clara, CA (US); Mobileye Vision Technologies, Jerusalem (IL)

( * ) Notice: Subject to any disclaimer, the term of this patent is extended or adjusted under 35 U.S.C. 154(b) by 77 days.

(21) Appl. No.: 16/729,335

(22) Filed: Dec. 28, 2019

(65) Prior Publication Data

US 2020/0130711 A1    Apr. 30, 2020

(51) Int. Cl.
*B60W 60/00*    (2020.01)
*B60W 30/095*    (2012.01)
(Continued)

(52) U.S. Cl.
CPC .... *B60W 60/0016* (2020.02); *B60W 30/0956* (2013.01); *B60W 40/105* (2013.01); *B60W 60/0018* (2020.02); *G05D 1/0088* (2013.01); *B60W 2554/4046* (2020.02); *B60W 2754/20* (2020.02); *G05D 2201/0213* (2013.01)

(58) Field of Classification Search
CPC ......... B60W 60/0016; B60W 60/0018; B60W 60/0015; B60W 60/00186; B60W 30/08; B60W 30/09; B60W 30/0956; B60W 40/105; B60W 2554/4046; B60W 2754/20; B60W 2754/30; B60W 2754/50; G05D 1/0055; G05D 1/0088; G05D 2201/0213

See application file for complete search history.

(56) References Cited

U.S. PATENT DOCUMENTS 9,805,527 B2 *  10/2017  Gupta ................... G06F 3/0634
10,315,649 B2 *  6/2019  Kadetotad ............. B60W 40/04
(Continued)

FOREIGN PATENT DOCUMENTS

WO    WO-2017116073 A1 *  7/2017  ............ B60W 50/14

*Primary Examiner* — Russell Frejd
*Assistant Examiner* — Brandon Z Willis
(74) *Attorney, Agent, or Firm* — Banner & Witcoff Ltd.

(57) ABSTRACT

An Autonomous Vehicle (AV) system, including: a tracking subsystem configured to detect and track relative positioning of another vehicle that is behind or lateral to an AV configured to comply with a safety driving model, and to check a safety driving model compliance status of the other vehicle; and a risk reduction subsystem configured to plan, based on the safety driving model compliance status of the other vehicle, an AV action, wherein if the safety driving model compliance status of the other vehicle is unknown or is known to be non-compliant, the AV action is administration of a safety driving model compliance test to the other vehicle, or is a maneuver by the AV to reduce risk of collision with a leading vehicle positioned in front of the AV.

22 Claims, 4 Drawing Sheets

(51) Int. Cl.
    *G05D 1/00*         (2006.01)
    *B60W 40/105*    (2012.01)

(56) References Cited

U.S. PATENT DOCUMENTS

| | | | |
|---|---|---|---|
| 10,351,132 B2* | 7/2019 | Schneider | B60T 7/124 |
| 10,762,798 B2* | 9/2020 | Hyun | G05D 1/0223 |
| 2018/0011496 A1* | 1/2018 | Fairfield | B60W 60/0011 |
| 2019/0009785 A1* | 1/2019 | Lawrenson | G01S 17/66 |
| 2019/0220014 A1* | 7/2019 | Bradley | G01S 17/66 |
| 2019/0250622 A1* | 8/2019 | Nister | B60W 60/0015 |
| 2021/0070286 A1* | 3/2021 | Green | B60W 30/09 |

\* cited by examiner

Figure 1

100
Example Driving Scenario

Figure 2

AUTONOMOUS VEHICLE SYSTEM FOR DETECTING SAFETY DRIVING MODEL COMPLIANCE STATUS OF ANOTHER VEHICLE, AND PLANNING ACCORDINGLY

TECHNICAL FIELD

The present disclosure generally relates to an Autonomous Vehicle (AV) system that detects safety driving model compliance status and safety of other vehicles, and plans accordingly.

BACKGROUND

Autonomous Vehicles (AVs) need to deal with uncertainties resulting from sharing roads with human drivers. Human behavior makes human-driven vehicles challenging and sometimes dangerous.

A safety driving model is a formal model for safety assurance of AV decision making based on common sense human-centered knowledge of what it means to drive safely and avoid accidents. The safety driving model is designed to mimic human judgment using mathematical formulas for safe decision-making by defining what constitutes a dangerous situation, what caused the dangerous situation, and the proper response. By doing so, the safety driving model ensures that the AV will not initiate a dangerous situation, and also ensures that the AV will respond appropriately when a dangerous situation is forced upon it.

Even if AVs comply with the safety driving model, avoidance of an accident due to another vehicle that does not comply with the safety driving model, such as a human-driven vehicle, may be difficult.

DESCRIPTION OF THE ASPECTS

The Autonomous Vehicle (AV) system disclosed herein is configured to detect and track lack of safety driving model compliance of other vehicles positioned behind or lateral to an AV, and to direct the autonomous vehicle to respond appropriately.

Figure 1:
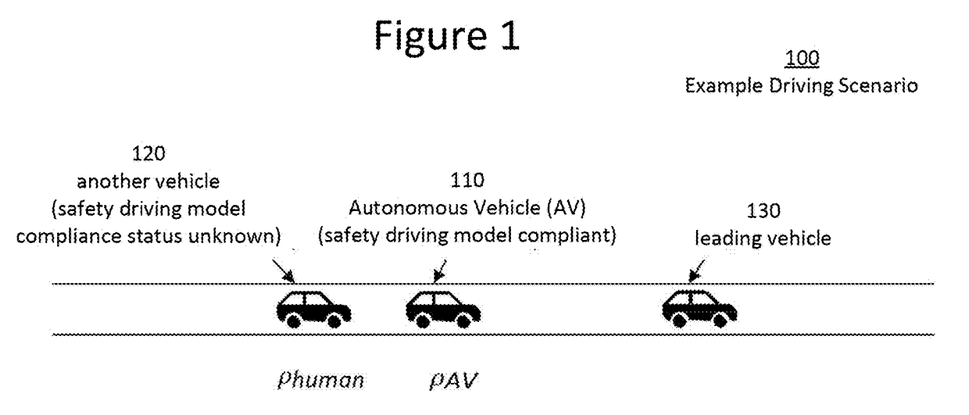
FIG. 1 illustrates an example driving scenario.

FIG. 1 illustrates an example driving scenario 100.

The driving scenario 100 involves an AV 110, another vehicle 120, and a leading vehicle 130. The AV 110 that is configured to comply with a safety driving model. The other vehicle 120 is traveling behind the AV 110 and is a human-driven vehicle, but the disclosure is not limiting in these respects. Unless stated otherwise, the other vehicle 120 may be traveling lateral to the AV 110, and may be an AV. The leading vehicle 130 traveling in front of the AV 110 has a safety driving model compliance status that may be unknown, but in any case, is not relevant.

A human driver's response time $\rho_{human}$ to an action is generally higher than the AV's response time $\rho_{AV}$. If the leading vehicle 130 performs a braking action, then the AV 110 should react with a proper response by braking to avoid a frontal collision with the leading vehicle 130. However, the other vehicle 120 might collide with the AV 110 due to not maintaining a safe longitudinal distance from the AV 110, or due to a slower human driver reaction time $\rho_{human}$. The result of this collision of the other vehicle 120 with the AV 110 could be a chain-reaction accident in which the AV 110 is caused to collide into the leading vehicle 130. This is because the AV 110 is affected by the additional energy from the collision by the other vehicle 120.

If an AV system of the AV 110 were to determine that the other vehicle 120 is not compliant with the safety driving model, the AV 110 could plan in a manner that would reduce the risk of the chain-reaction accident. The AV 110 could use existing sensors to detect whether it is being followed by another vehicle 120, and whether this other vehicle 120 is compliant with a safety model driving model. If the other vehicle 120 is not compliant, the AV 110 may take this non-compliance information into account in planning a safe distance from the leading vehicle 130 and proper responses.

Figure 2:
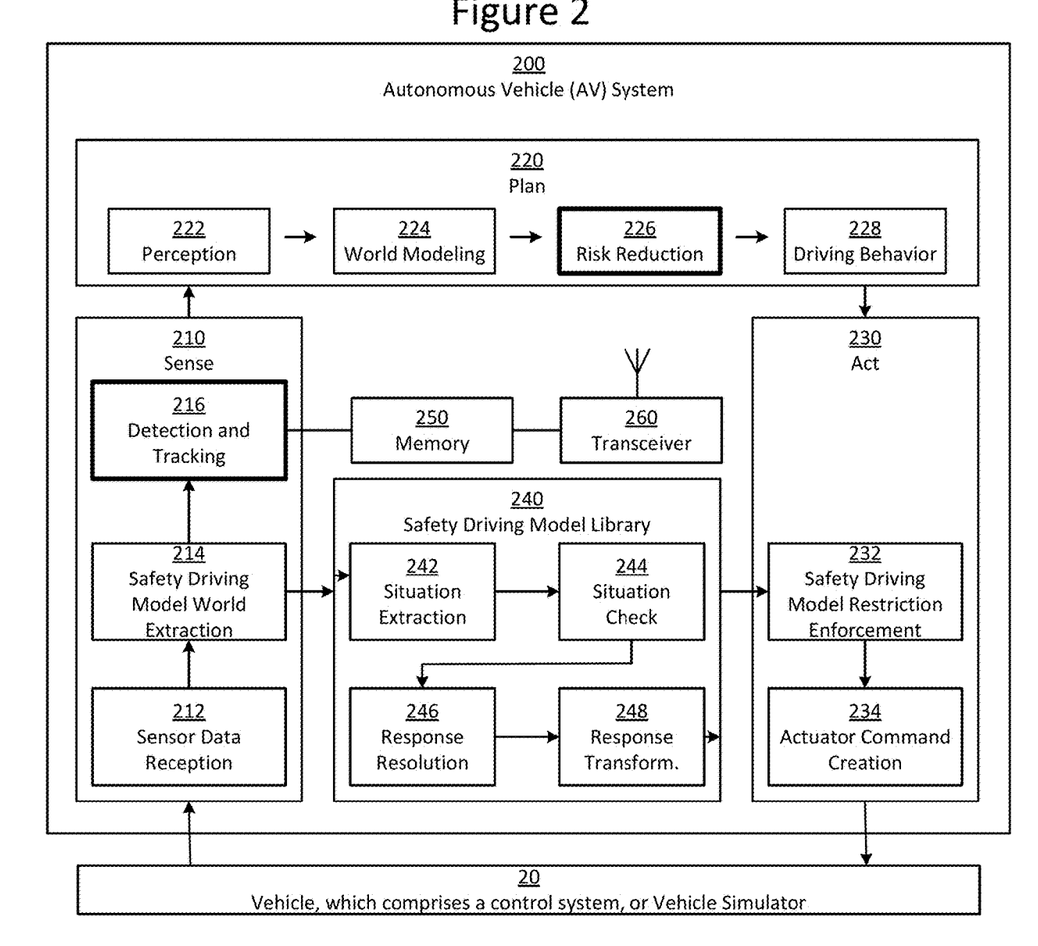
FIG. 2 illustrates a schematic diagram of an AV system in accordance with aspects of the disclosure.

FIG. 2 illustrates a schematic diagram of an AV system 200 in accordance with aspects of the disclosure. The AV system 200 is configured to interact with or be part of a vehicle, which comprises a control system, or a vehicle simulator 20. In the case of a vehicle, the AV system 200 transforms the vehicle into an AV.

The architecture of the AV system 200 comprises three main subsystems: sense subsystem 210, plan subsystem 220, and act subsystem 230. The sense subsystem 210 provides world model data that is used by the plan subsystem 220 to create near term actuator control commands executed by the act subsystem 230. The AV system 200 may also comprise a safety driving model library 240, a memory 250, and a transceiver 260.

Sense Subsystem 210:

The sense subsystem 210 interfaces with the real world by receiving, processing, and fusing sensor information. It provides world model data to the plan subsystem 220 and the safety driving model library 240.

The sense subsystem 210 comprises a sensor data reception subsystem 212, a safety driving model world extraction subsystem 214, and a detection and tracking subsystem 216 (hereinafter "tracking system 216").

Sensor Data Reception Subsystem 212:

The sensor data reception subsystem 212 is responsible for the perception of the AV's 110 environment. The sensor data reception subsystem 212 receives sensor data from sensors installed in the AV 110.

Safety Driving Model World Extraction Subsystem 214:

The safety driving model world extraction subsystem 214 is configured to extract from the received sensor data the world model.

Detection and Tracking Subsystem 216 ("Tracking Subsystem 216"):

The tracking subsystem 216 is configured to detect and track relative positioning of another vehicle 120 that is located behind or lateral to an AV 110, and to check a safety driving model compliance status of the other vehicle 120. The AV 110 is configured to comply with a safety driving model.

The tracking subsystem 216 is also configured to add the other vehicle 120 and corresponding safety driving model compliance status to a list of known other vehicles. This list may include information such as the other vehicle's position and identification number, safety driving model compliance status (i.e., compliant, non-compliant, or unknown), current safety risk status, and a maximum observed or measured safety risk.

The tracking subsystem 216 may also be configured to determine if the AV 110 in relation to the other vehicle 120 is in a dangerous situation. A dangerous situation may be defined as when a risk of collision between the other vehicle 120 and the AV 110 is higher than a threshold risk $T_{risk}$. If the tracking subsystem 216 determines that the AV 110 in relation to the other vehicle 120 is in a dangerous situation, the tracking subsystem 216 is configured to determine whether the other vehicle 120 is safety driving model compliant. Compliance may be determined by monitoring the other vehicle's reaction to the dangerous situation, or by comparing the other vehicle's response time $\rho_{other}$ to the dangerous situation with a threshold response time $\rho_{threshold}$. The other vehicle's response time $\rho_{other}$ to the dangerous situation is defined as being from a beginning of the dangerous situation to the other vehicle's reaction to the dangerous situation.

The tracking subsystem 216 may configured to assign the other vehicle 120 a safety risk grade. The safety risk grade is updated by the tracking subsystem 216 continuously as the other vehicle 120 approaches the AV 110, possibly in an unsafe manner. The maximum observed or measured safety risk grade is the highest safety risk grade that the other vehicle 120 has ever achieved relative to the AV 110. In this way, the plan subsystem 220 may plan ahead of time. The safety risk grade may be a number, more general levels, such as low, medium, and high, or any other grading system as suitable.

The safety risk grade may depend on a tolerance of the AV 110, such as whether the AV 110 is in a dangerous situation. If there is enough longitudinal distance between the AV 110 and the leading vehicle 130, then the AV 110 is not in a dangerous situation and can tolerate more safety risk from the other vehicle 120 traveling behind the AV 110 because the AV 110 has an option to accelerate. If the leading vehicle 130 breaks suddenly, however, the AV 110 has no option but to break. The safety risk tolerance of the AV 110 then decreases due to the increased risk imposed by the leading vehicle 130 coupled with a potential risk that the other vehicle 120 will tailgate the AV 110.

The tracking subsystem 216 is configured to detect and track a plurality of other vehicles 120. The tracking subsystem 216 may be configured to assign the plurality of other vehicles 120 respective safety risk grades, and to rank the plurality of other vehicles 120 in accordance with the respective safety risk grades.

Figure 3:
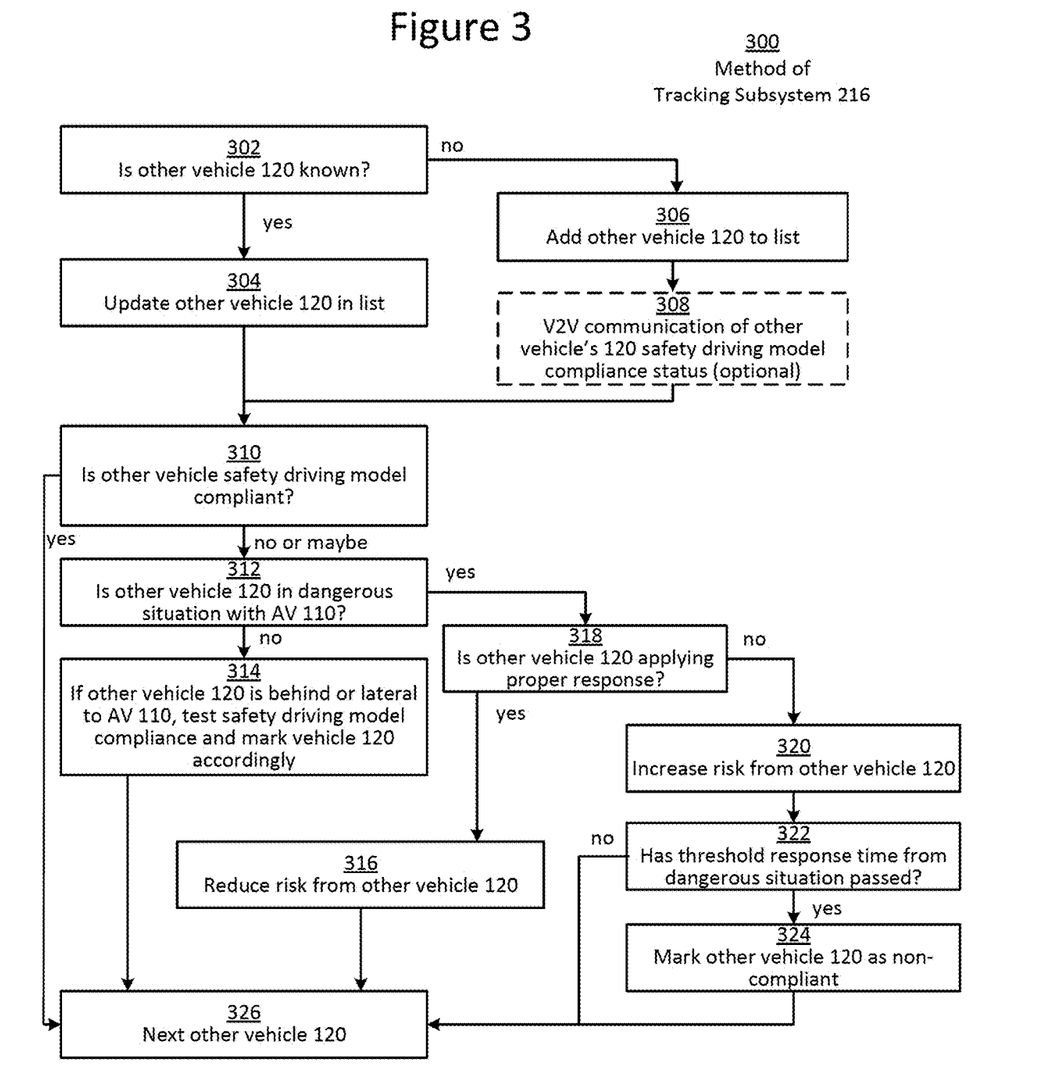
FIG. 3 illustrates a flowchart of a method of the tracking subsystem of FIG. 2 in accordance with aspects of the disclosure.

FIG. 3 illustrates a flowchart of a method 300 of the tracking subsystem 216 of FIG. 2 in accordance with aspects of the disclosure.

By way of overview, the tracking subsystem 216 checks the status of another vehicle 120 in proximity to the AV 110, and then marks the other vehicle 120 as safety driving model compliant, maybe compliant, or non-compliant. The tracking subsystem 216 should know the identification, position, velocity, and acceleration of the other vehicle 120. This information is generally obtained from the sensors installed in the AV 110.

Turning to the flowchart, it is first determined if the other vehicle 120 is known (Step 302). If the other vehicle 120 is known, the tracking subsystem 216 updates the list of known vehicles with the other vehicle's new information (Step 304). On the other hand, if the other vehicle 120 is not known, the tracking subsystem 216 adds the other vehicle 120 to the list of known vehicles in order to track its safety driving model compliance (Step 306). If Vehicle-to-Vehicle (V2V) communication is implemented by both the AV 110 and the other vehicle 120, V2V communication may be used to communicate the other vehicle's 120 safety driving model compliance status (Step 308). Based on the communication result, the other vehicle 120 may be marked as safety driving model compliant, may be compliant, or non-compliant (Step 310). If the other vehicle 120 is compliant, then a next other vehicle may be considered (Step 326). The other vehicle 120 is initially indicated as may be compliant. So if no communication is obtained from the other vehicle 120, the other vehicle 120 remains marked as may be compliant. Then, as discussed herein, the other vehicle 120 may be tracked for its position and situations against the AV 110 in an attempt for the tracking subsystem 216 to determine its safety driving model compliance status.

Next it is determined whether the other vehicle 120 is in a dangerous situation with the AV 110 (Step 312). If the other vehicle 120 enters a dangerous situation with the AV 110 and both vehicles 110, 120 are configured to comply with the safety driving model, the tracking subsystem 216 determines whether the other vehicle 120 reacts to the dangerous situation with a proper response (Step 318), reduces the safety risk grade of the other vehicle 120 (Step 316), and then may consider the next other vehicle (Step 326). If the other vehicle 120 does apply a proper response, the tracking system 216 cannot positively know if the other vehicle 120 is safety driving model compliant. On the other hand, if the other vehicle 120 does not react with a proper response, then the tracking subsystem 216 knows that the other vehicle 120 is not committed to safety driving model guidelines, and the tracking subsystem 216 increases its safety risk grade (Step 320). It is then determined if the threshold response time $\rho_{threshold}$ has passed since the dangerous situation began (Step 322). The threshold response time $\rho_{threshold}$ should be greater or equal than other vehicle's 120 assumed response time $\rho_{other}$, that is, unless the other vehicle's 120 response time $\rho_{other}$ is communicated via V2V communications. It could be assumed that the other vehicle's 120 response time $\rho_{other}$ corresponds with that of a human $\rho_{human}$ (e.g., 1 or 2 seconds) or to the one of an AV $\rho_{AV}$ (e.g., 0.1 to 0.9 seconds). If the threshold response time $\rho_{threshold}$ has passed, the other vehicle 120 is marked as non-compliant with the safety driving model (Step 324), and then a next other vehicle is considered (Step 326). On the other hand, if the threshold response time $\rho_{threshold}$ has not passed, then any next other vehicle may be considered (Step 326).

Turning back to Step 312, if the other vehicle 120 is not in a dangerous situation with the AV 110, the tracking subsystem 216 may mark the other vehicle 120 for possible safety driving model compliance testing (Step 314). The plan subsystem 220 will decide how to actuate (whether or not to test for compliance) based on all the other vehicle information. A next other vehicle 120 may then be considered (Step 326).

Every vehicle has an associated level of safety risk, with safety driving model compliant vehicles considered to have null risk. The more dangerous the situation of the other vehicle 120, and the greater the lack of the other vehicle's 120 reaction, the higher its associated safety risk. This safety risk information can assist the plan subsystem 220 to keep a further distance from, or even avoid, this other vehicle 120.

Plan Subsystem 220:

The plan subsystem 220 is configured to process the world model data from the sense subsystem 210 and create near term actuator control commands to be executed by the act subsystem 230. The plan subsystem 220 performs decision-making for the AV system 200 based on the world model data, taking into consideration AV status to avoid an accident by planning a maneuver to be executed at a wrong time.

The plan subsystem 220 comprises a perception subsystem 222, a world modeling subsystem 224, a risk reduction subsystem 226, and a driving behavior subsystem 228.

Perception Subsystem 222:

The perception subsystem 222 is configured to process the world model data to define what is around the AV 110.

World Modeling Subsystem 224:

A world model is expressed in a world coordinate system. The world modeling subsystem 224 is configured to translate the world coordinates into lane coordinates for the safety model to make safety calculations.

Risk Reduction Subsystem 226:

The risk reduction subsystem 226 is configured to plan, based on the safety driving model compliance status of the other vehicle 120 obtained from the tracking submodule 216, an AV action. If the safety driving model compliance status of the other vehicle 120 is unknown or is known to be non-compliant, the AV action is administration of a safety driving model compliance test to the other vehicle 120, or is a maneuver by the AV 110 to reduce risk of collision with a leading vehicle 130 positioned in front of the AV 110.

The safety driving model compliance test comprises requesting a control system of the AV to perform an AV action, and monitoring a reaction by the other vehicle 120 to the AV action. The AV action may comprise requesting the control system of the AV to perform a braking action, or alternatively, reduce a distance between the AV 110 and the other vehicle 120. The monitoring comprises comparing a response time $\rho_{other}$ of the reaction by the other vehicle 120 with a threshold response time $\rho_{threshold}$. The disclosure is not limited to these AV actions and this specific monitoring, but may be any AV action and monitoring as is suitable. This safety model compliance test is to detect safety driving model compliance by another vehicle 120 that is located behind or lateral to the AV. Generally, this compliance test is not meant to be for the leading vehicle 130, unless there is an AV action that would result in a leading vehicle reaction. Generally, for example, if the leading vehicle 130 breaks, the AV 110 does not know why the leading vehicle 130 is breaking. This is usually because of occlusions (i.e., partial information) from what lies ahead of the leading vehicle 130. There might be a circumstance in which the AV 110 might know those conditions, for example, by receiving such information from infrastructure or V2V communications. But in most cases it is assumed that due to occlusions, deriving the reason the leading vehicle 130 brakes is difficult.

The other vehicle 120 is assumed to be non-compliant unless the tracking subsystem 216 determines otherwise. Merely because the other vehicle 120 reacts with a proper response within the threshold response time $\rho_{threshold}$ does not necessarily mean that the other vehicle 120 is configured to be safety driving model compliant.

The maneuver by the AV 110 to reduce the risk of collision with the leading vehicle 130 is requesting the control system to increase a distance between the AV 110 and the other vehicle 120, change lanes, re-route the AV 110 to allow the other vehicle 120 to pass the AV 110, decrease speed, increase a distance between the AV 110 and the leading vehicle 130, or honk a horn.

If the control system of the AV 110 is actuating a priority maneuver, the risk reduction subsystem 226 is configured to delay or cancel the plan of the AV action. A "priority maneuver" is a maneuver the AV must execute in order to comply with the safety driving model, such as during a safety-critical situation. For example, if the leading vehicle 130 is traveling at a much slower speed then the AV 110, then the priority maneuver would be to break.

Also, the risk reduction subsystem 226 may be configured to plan the maneuver by the AV 110 to prioritize avoidance of another vehicle of the plurality of other vehicles 120 having a highest safety risk grade and provide the planned maneuver to the control system of the AV.

Figure 4:
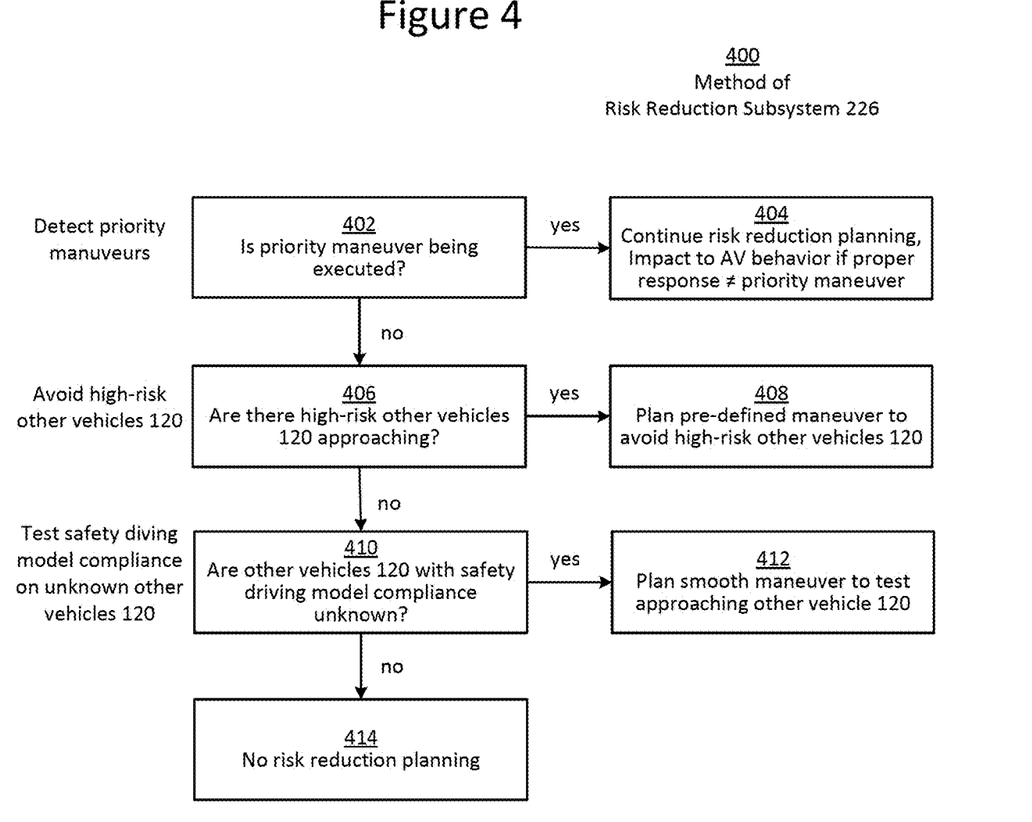
FIG. 4 illustrates a flowchart of a method of the risk reduction subsystem of FIG. 2 in accordance with aspects of the disclosure.

FIG. 4 illustrates a flowchart of a method 400 of the risk reduction subsystem 226 of FIG. 2 in accordance with aspects of the disclosure.

First, the risk reduction subsystem 226 determines if the AV 110 is actuating on a priority maneuver (Step 402). If the AV 110 is actuating a priority maneuver, the risk reduction subsystem 226 can continue risk reduction planning calculations, but there is no significant impact to the behavior of the AV 110 unless the risk reduction subsystem determines that a proper response is different from the priority maneuver. In such a case, the risk reduction subsystem 226 causes the proper response to be implemented in order to achieve risk reduction. (Step 404). A priority maneuver is a proper response to a dangerous situation, and may involve emergency vehicle responses (e.g., police), or planned navigational responses (e.g., exit the highway, or turn in the intersection).

Alternatively, if no priority maneuver is in process, the risk reduction submodule 226 determines where there are other vehicles 120 that are high risk to the AV 110 (Step 406). If so, the risk reduction submodule 226 plans a predefined maneuver to prioritize avoidance of high-risk vehicles (Step 408). The maneuver may be to evade the other vehicle 120 and reduce risk, or to execute a proper reaction as defined in the safety driving model to increase lateral and/or longitudinal distance by staying off the path of the high-risk vehicle 120. The AV 110 may change lanes if the AV 110 is traveling on a multi-lane road and space is available. If there is no leading vehicle 130 in front of the AV 110, the AV 110 may speed up while traveling on a straight road until a lane change is available. Otherwise, the risk reduction submodule 226 may consider causing the control system to re-route the AV 110 to allow other vehicle 120 to pass (e.g., go around a block in a city, or exit and re-enter a highway). Alternatively, the AV 110 may slowly and carefully decrease its speed and increase distance from a leading vehicle 130; this allows for enough space between the AV 110 and the leading vehicle 130 such that the AV 110 can brake for itself and the braking reaction from the other vehicle 120 traveling behind the AV 110. Optionally, when the other vehicle 120 is traveling lateral to the AV 110 and is high risk (i.e., a dangerous situation), it may be practical for the AV 110 to honk its horn.

When there are no other vehicles 120 in a dangerous situation, it is determined whether other vehicles 120 have a safety driving model compliance that is unknown (Step 410). If not, no risk reduction planning is performed (414). But if there are other vehicles 120 that have a safety driving model compliance that is unknown, it may be useful to test the other vehicles 120 for safety driving model compliance (Step 412). For example, one situation during which compliance testing may be performed is if the other vehicle 120 is approaching the AV 110 quickly from behind, but is still at a safe longitudinal distance from the AV 110. In order to administer the safety driving model compliance test, the AV 110 plans a smooth maneuver (e.g., smoothly apply brakes), without compromising safety or the comfort of driving, and monitors any reaction of the other vehicle 120. If the other vehicle 120 enters a dangerous distance and does not react properly, then the risk reduction submodule 226 can conclude the other vehicle 120 is not safety driving model compliant. Also, if the other vehicle 120 over-reacts, increasing the distance more than before the reaction, then the risk reduction subsystem 226 may conclude that the other vehicle 120 is not safety driving model compliant. In other cases, the other vehicle's 120 compliance remains unknown.

Driving Behavior Subsystem 228:

The driving behavior subsystem 228 is configured to plan the driving behavior with any risk reduced.

Act Subsystem 230:

The act subsystem 230 is configured to receive actuator control commands from the plan subsystem 220, and restrict control values according to the restrictions calculated by the safety driving model. The resulting control commands control the vehicle actuator system, and are safe in respect to the safety driving model rules.

The act subsystem 230 comprises a safety driving model restriction enforcement subsystem 232, and an actuator command creation subsystem 234.

Safety Driving Model Restriction Enforcement Subsystem 232:

The safety driving model restriction enforcement subsystem 232 is configured to apply actuator command restrictions, such as lateral and longitudinal acceleration restrictions received from the safety driving model library 240.

Actuator Command Creation Subsystem 234:

The actuator command creation subsystem 234 is configured to send the actuator commands, which correspond to the control commands from the plan subsystem 220 combined with the actuator command restrictions from the safety driving model restriction enforcement subsystem 232, to the control system for action by the AV 110.

Safety Driving Model Library 240:

The safety driving model library 240 provides a software implementation of the safety driving model. This library 240 receives post-processed sensor information from the sense subsystem 210, and provides a transformed response as output to the act subsystem 230.

The safety driving model library 240 comprises a situation extraction subsystem 242, a situation check subsystem 244, a response resolution subsystem 246, and a response transformation subsystem 248. The situation extraction subsystem 242 is configured to receive an object list with information about all objects in the surrounding environment of the AV 110. Then, the situation extraction subsystem 242 creates an object-AV pair, for each object. This pair is usually referred to as "Situation." The situation check subsystem 244, for all situations, performs safety driving model checks and calculates a proper response. The response resolution subsystem 246 is configured to compute an overall response. The response transformation subsystem 248 is configured to send out the transformed response.

Memory 250:

The memory 250 is configured to store the list of known other vehicles and corresponding safety driving model compliance status.

Transceiver 260:

The transceiver 260 is configured to enable the tracking subsystem 216 to provide the list of known vehicles and corresponding safety driving model compliance status, to another AV system of another vehicle 120. The sharing may be executed using Vehicle-to-Vehicle (V2V) communications. In this way, the AV 110 can leverage information about high safety risk vehicles.

The AV system 200 is an example system. The disclosure is not meant to be limited to the exact configuration disclosed. One of ordinary skill would understand that modifications may be made thereto without departing from the spirit or scope of the disclosure.

Aspects of the disclosure may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor" can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Various aspects described herein may use one or more machine learning models to perform functions of an AV stack (or other functions described herein). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models may take any suitable form or use any suitable techniques. For example, any of the machine learning models may use supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may use one or more classification models. In a classification model, the outputs may be restricted to a limited set of values. The classification model may output a class for an input set of one or more input values. References to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various aspects described herein may use one or more regression models. A regression model may output a numerical value from a continuous range based on an input set of one or more values. References to regression models may contemplate a model that implements, e.g., any one or more of the following techniques (or other suitable techniques): linear regression, decision trees, random forest, or neural networks.

The techniques of this disclosure may also be described in the following examples.

Example 1

An Autonomous Vehicle (AV) system, comprising: a tracking subsystem configured to detect and track relative positioning of another vehicle that is behind or lateral to an AV configured to comply with a safety driving model, and to check a safety driving model compliance status of the other vehicle; and a risk reduction subsystem configured to plan, based on the safety driving model compliance status of the other vehicle, an AV action, wherein if the safety driving model compliance status of the other vehicle is unknown or is known to be non-compliant, the AV action is administration of a safety driving model compliance test to the other vehicle, or is a maneuver by the AV to reduce risk of collision with a leading vehicle positioned in front of the AV.

Example 2

The AV system of example 1, wherein the safety driving model compliance test comprises: requesting a control system of the AV to perform an AV action; and monitoring a reaction by the other vehicle to the AV action.

Example 3

The AV system of example 2, wherein the AV action comprises requesting the control system to perform a braking action, and the monitoring comprises comparing a response time of the reaction by the other vehicle with a threshold response time.

Example 4

The AV system of example 2, wherein the AV action comprises request the control system of the AV to reduce a distance between the AV and the other vehicle, and the monitoring comprises comparing a response time of the other vehicle reaction with a threshold response time.

Example 5

The AV system of example 1, further comprising: a memory configured to store a list of known other vehicles and corresponding safety driving model compliance status.

Example 6

The AV system of example 5, wherein the tracking subsystem is configured to add the other vehicle and corresponding safety driving model compliance status to the list of known other vehicles.

Example 7

The AV system of example 5, further comprising: a transceiver, wherein the tracking subsystem is configured to provide, via the transceiver, the list of known vehicles and corresponding safety driving model compliance status, to another AV system of another vehicle.

Example 8

The AV system of example 1, wherein the tracking subsystem is configured to determine if the AV in relation to the other vehicle is in a dangerous situation, wherein a dangerous situation is when a risk of collision between the AV and the other vehicle is higher than a threshold risk.

Example 9

The AV system of example 8, wherein if the tracking subsystem determines that the AV in relation to the other vehicle is in a dangerous situation, the tracking subsystem is configured to determine whether the other vehicle is safety driving model compliant by monitoring the other vehicle's reaction to the dangerous situation, or by comparing the other vehicle's response time, which is from a beginning of the dangerous situation to the other vehicle's reaction to the dangerous situation, with a threshold response time.

Example 10

The AV system of example 1, wherein the other vehicle is assumed to be non-compliant unless the tracking subsystem determines otherwise.

Example 11

The AV system of example 1, wherein the maneuver to reduce the risk of collision with the leading vehicle positioned in front of the AV is requesting the control system of the AV to increase a distance between the AV and the other vehicle, change lanes, re-route the AV to allow the other vehicle to pass the AV, decrease speed, increase a distance between the AV and the leading vehicle, or honk a horn.

Example 12

The AV system of example 1, wherein if the control system of the AV is actuating a priority maneuver, the risk reduction subsystem is configured to delay or cancel the plan of the AV action.

Example 13

The AV system of example 1, wherein the tracking subsystem is configured to assign the other vehicle a safety risk grade.

Example 14

The AV system of example 1, wherein the tracking subsystem is configured to detect and track a plurality of other vehicles.

Example 15

The AV system of example 14, wherein the tracking subsystem is configured to assign the plurality of other vehicles respective safety risk grades, and to rank the plurality of other vehicles in accordance with the respective safety risk grades.

Example 16

The AV system of example 15, wherein the risk reduction subsystem is configured to plan the maneuver by the AV to prioritize avoidance of another vehicle of the plurality of other vehicles having a highest safety risk grade and provide the planned maneuver to the control system of the AV.

Example 17

An Autonomous Vehicle (AV), comprising: an AV system, comprising: a tracking subsystem configured to detect and track relative positioning of another vehicle that is behind or lateral to an AV configured to comply with a safety driving model, and to check a safety driving model compliance status of the other vehicle; and a risk reduction subsystem configured to plan, based on the safety driving model compliance status of the other vehicle, AV action, wherein if the safety driving model compliance status of the other vehicle is unknown or is known to be non-compliant, the AV action is administration of a safety driving model compliance test to the other vehicle, or is a maneuver by the AV to reduce risk of collision with a leading vehicle positioned in front of the AV; and a control system configured to perform the AV action.

Example 18

The AV of example 17, wherein the safety driving model compliance test comprises: requesting a control system of the AV to perform an AV action; and monitoring a reaction by the other vehicle to the AV action.

Example 19

The AV of example 18, wherein the AV action comprises requesting the control system to perform a braking action, and the monitoring comprises comparing a response time of the reaction by the other vehicle with a threshold response time.

Example 20

The AV of example 18, wherein the AV action comprises request the control system of the AV to reduce a distance between the AV and the other vehicle, and the monitoring comprises comparing a response time of the other vehicle reaction with a threshold response time.

Example 21

The AV of example 17, wherein the maneuver to reduce the risk of collision with the leading vehicle positioned in front of the AV is requesting the control system of the AV to increase a distance between the AV and the other vehicle, change lanes, re-route the AV to allow the other vehicle to pass the AV, decrease speed, increase a distance between the AV and the leading vehicle, or honk a horn.

Example 22

A non-transitory machine-readable media, comprising instructions, which when executed, cause a processor of an Autonomous Vehicle (AV) system to: detect and track, by a tracking subsystem, relative positioning of another vehicle that is behind or lateral to an AV configured to comply with a safety driving model; check, by the tracking subsystem, a safety driving model compliance status of the surrounding vehicle; and plan, by a risk reduction subsystem, an AV action based on the safety driving model compliance status of the surrounding vehicle, wherein if the safety driving model compliance status of the surrounding vehicle is unknown or is known to be non-compliant, the AV action is administration of a safety driving model compliance test to the surrounding vehicle, or is a maneuver by the AV to reduce risk of collision with a leading vehicle positioned in front of the AV.

Example 23

The non-transitory machine-readable media of example 22, wherein the safety driving model compliance test comprises: requesting a control system of the AV to perform an AV action; and monitoring a reaction by the other vehicle to the AV action.

Example 24

The non-transitory machine-readable media of example 23, wherein the AV action comprises requesting the control system to perform a braking action, and the monitoring comprises comparing a response time of the reaction by the other vehicle with a threshold response time.

Example 25

The non-transitory machine-readable media of example 22, wherein the other vehicle is assumed to be non-compliant unless the tracking subsystem determines otherwise.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:
1. An Autonomous Vehicle (AV) system, comprising:
a tracking subsystem configured to detect and track relative positioning of other vehicles that are behind or lateral to an AV configured to comply with a safety driving model, and to check and store safety driving model compliance statuses of the other vehicles; and
a risk reduction subsystem configured to:
determine whether the tracking subsystem has stored therein a safety driving model compliance status of another vehicle that is behind or lateral to the AV; and
if the tracking subsystem does not have stored therein the safety driving model compliance status of the other vehicle, prompt a control system of the AV to administer a safety driving model compliance test to the other vehicle by causing the AV to perform an AV compliance test action, determining the safety driving model compliance status of the other vehicle based on a reaction by the other vehicle to the AV compliance test action, and storing in the tracking subsystem the determined safety driving model compliance status of the other vehicle.

2. The AV system of claim 1, wherein the AV compliance test action comprises a braking action, and the determining comprises comparing a response time of the reaction by the other vehicle with a threshold response time.

3. The AV system of claim 1, wherein the AV compliance test action comprises reducing a distance between the AV and the other vehicle, and the determining comprises comparing a response time of the other vehicle reaction with a threshold response time.

4. The AV system of claim 1, further comprising:
a memory configured to store a list of the other vehicles and corresponding safety driving model compliance statuses.

5. The AV system of claim 4, wherein the tracking subsystem is configured to add the other vehicle and corresponding safety driving model compliance status to the list of known other vehicles.

6. The AV system of claim 4, further comprising:
a transceiver,
wherein the tracking subsystem is configured to provide, via the transceiver, the list of other vehicles and corresponding safety driving model compliance statuses, to another AV system of another vehicle.

7. The AV system of claim 1, wherein the tracking subsystem is configured to determine if the AV in relation to the other vehicle is in a dangerous situation, wherein a dangerous situation is when a risk of collision between the AV and the other vehicle is higher than a threshold risk.

8. The AV system of claim 7, wherein if the tracking subsystem determines that the AV in relation to the other vehicle is in a dangerous situation, the tracking subsystem is configured to determine whether the other vehicle is safety driving model compliant by monitoring the other vehicle's reaction to the dangerous situation, or by comparing the other vehicle's response time, which is from a beginning of the dangerous situation to the other vehicle's reaction to the dangerous situation, with a threshold response time.

9. The AV system of claim 1, wherein the other vehicle is assumed to be non-compliant unless the tracking subsystem determines otherwise.

10. The AV system of claim 1, wherein the AV compliance test action includes a maneuver by the AV to reduce risk of collision with a leading vehicle positioned in front of the AV, and the maneuver is an increase in a distance between the AV and the other vehicle, a change of lanes, a re-routing of the AV to allow the other vehicle to pass the AV, a decrease in speed, an increase in a distance between the AV and the leading vehicle, or a honk of a horn.

11. The AV system of claim 1, wherein if the control system of the AV is actuating a priority maneuver, the risk reduction subsystem is configured to delay or cancel the performance of the AV compliance test action.

12. The AV system of claim 1, wherein the tracking subsystem is configured to assign the other vehicle a safety risk grade.

13. The AV system of claim 1, wherein the risk reduction subsystem is configured to plan a maneuver by the AV to prioritize avoidance of another vehicle of the plurality of other vehicles having a highest safety risk grade and provide the planned maneuver to the control system of the AV.

14. The AV system of claim 1, wherein the tracking subsystem is further configured to detect and track a plurality of other vehicles, assign the plurality of other vehicles respective safety risk grades at least partially based on results of AV administration of safety driving model compliance tests to the plurality of other vehicles, and rank the plurality of other vehicles in accordance with the respective safety risk grades.

15. An Autonomous Vehicle (AV), comprising:
an AV system, comprising:
a tracking subsystem configured to detect and track relative positioning of other vehicles that are behind or lateral to an AV configured to comply with a safety driving model, and to check and store safety driving model compliance statuses of the other vehicles; and
a risk reduction subsystem configured to:
determine whether the tracking subsystem has stored therein a safety driving model compliance status of another vehicle that is behind or lateral to the AV;
if the tracking subsystem does not have stored therein the safety driving model compliance status of the other vehicle, prompt a control system of the AV to administer a safety driving model compliance test to the other vehicle by causing the AV to perform an AV compliance test action, determining the safety driving model compliance status of the other vehicle based on a reaction by the other vehicle to the AV compliance test action, and storing in the tracking subsystem the determined safety driving model compliance status of the other vehicle; and
the control system configured to perform the AV compliance test action.

16. The AV of claim 15, wherein the AV compliance test action comprises a braking action, and the determining comprises comparing a response time of the reaction by the other vehicle with a threshold response time.

17. The AV of claim 15, wherein the AV compliance test action comprises a reduction in a distance between the AV and the other vehicle, and the determining comprises comparing a response time of the other vehicle reaction with a threshold response time.

18. The AV of claim 15, wherein the AV compliance test action includes a maneuver by the AV to reduce risk of collision with a leading vehicle positioned in front of the AV, and the maneuver is an increase in a distance between the AV and the other vehicle, a change of lanes, a re-routing of the AV to allow the other vehicle to pass the AV, a decrease in speed, an increase in a distance between the AV and the leading vehicle, or a honk of a horn.

19. The AV of claim 15, wherein the tracking subsystem is further configured to detect and track a plurality of other vehicles, assign the plurality of other vehicles respective safety risk grades at least partially based on results of AV administration of safety driving model compliance tests to the plurality of other vehicles, and rank the plurality of other vehicles in accordance with the respective safety risk grades.

20. A non-transitory machine-readable media, comprising instructions, which when executed, cause a processor of an Autonomous Vehicle (AV) system to:
  detect and track, by a tracking subsystem, relative positioning of other vehicles that are behind or lateral to an AV configured to comply with a safety driving model;
  determine by a risk reduction subsystem, whether the tracking subsystem has stored therein a safety driving model compliance status of another vehicle that is behind or lateral to the AV; and
  if the tracking subsystem does not have stored therein the safety driving model compliance status of the other vehicle, prompt a control system of the AV to administer a safety driving model compliance test to the other vehicle by causing the AV to perform an AV compliance test action, determining the safety driving model compliance status of the other vehicle based on a reaction by the other vehicle to the AV compliance test action, and storing in the tracking subsystem the determined safety driving model compliance status of the other vehicle.

21. The non-transitory machine-readable media of claim 20, wherein the other vehicle is assumed to be non-compliant unless the tracking subsystem determines otherwise.

22. The non-transitory machine-readable media of claim 20, wherein the instructions further cause the processor to:
  detect and track, by the tracking subsystem, a plurality of other vehicles;
  assign, by the tracking subsystem, the plurality of other vehicles respective safety risk grades at least partially based on results of AV administration of safety driving model compliance tests to the plurality of other vehicles; and
  rank, by the tracking subsystem, the plurality of other vehicles in accordance with the respective safety risk grades.

\* \* \* \* \*